(12) United States Patent
Bodary et al.

(10) Patent No.: US 11,440,348 B1
(45) Date of Patent: Sep. 13, 2022

(54) AXLE ASSEMBLY HAVING A LUBRICANT RESERVOIR

(71) Applicant: ArvinMeritor Technology, LLC, Troy, MI (US)

(72) Inventors: Andrew Bodary, Troy, MI (US); Dale Kwasniewski, Troy, MI (US); Tim Mann, Troy, MI (US); Leo Wenstrup, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/342,881

(22) Filed: Jun. 9, 2021

(51) Int. Cl.
*B60B 35/16* (2006.01)
*F16H 57/04* (2010.01)

(52) U.S. Cl.
CPC ....... *B60B 35/163* (2013.01); *F16H 57/0457* (2013.01); *F16H 57/0483* (2013.01)

(58) Field of Classification Search
CPC .............. B60B 35/163; F16H 57/0457; F16H 57/0483

USPC ........................................................ 475/160
See application file for complete search history.

(56) References Cited

U.S. PATENT DOCUMENTS

| | | | |
|---|---|---|---|
| 9,944,229 B2 | 4/2018 | Kelly et al. | |
| 10,279,625 B2 | 5/2019 | Kelly et al. | |
| 10,626,979 B2 | 4/2020 | Hayes et al. | |
| 2009/0173184 A1* | 7/2009 | Beutler | B60B 35/163 74/606 A |
| 2014/0231211 A1* | 8/2014 | Nett | F16H 57/0471 192/113.1 |
| 2016/0046151 A1* | 2/2016 | Kelly | F16H 57/045 74/607 |
| 2016/0047461 A1 | 2/2016 | Kelly et al. | |
| 2017/0074389 A1* | 3/2017 | Bodary | F16H 57/037 |
| 2020/0047613 A1 | 2/2020 | Eschenburg et al. | |

* cited by examiner

*Primary Examiner* — Colby M Hansen
(74) *Attorney, Agent, or Firm* — Brooks Kushman PC (57) ABSTRACT

An axle assembly that has a lubricant reservoir. The lubricant reservoir may be disposed above a differential assembly and may capture lubricant that is splashed by the differential assembly. The lubricant reservoir may have at least one tank. The lubricant reservoir may optionally provide lubricant to a lubricant distribution trough.

20 Claims, 6 Drawing Sheets

AXLE ASSEMBLY HAVING A LUBRICANT RESERVOIR

TECHNICAL FIELD

This relates to an axle assembly that has a lubricant reservoir.

BACKGROUND

An axle assembly having an upper lubricant reservoir disposed inside a differential carrier is disclosed in U.S. Patent Publication No. 2020/0047613.

SUMMARY

In at least one embodiment an axle assembly is provided. The axle assembly may include a differential assembly, a housing assembly, a lubricant reservoir, a first conduit, and a second conduit. The differential assembly is rotatable about an axis and has a ring gear. The housing assembly receives the differential assembly. The lubricant reservoir is disposed above the differential assembly and captures lubricant that is splashed by the ring gear. The lubricant reservoir has a first tank and a second tank that is spaced apart from the first tank. The first conduit routes lubricant from the first tank to an input shaft bearing. The second conduit routes lubricant from the second tank to an output shaft bearing.

In at least one embodiment an axle assembly is provided. The axle assembly may include a differential assembly, a housing assembly, a lubricant reservoir, and a lubricant distribution trough. The differential assembly is rotatable about an axis and has a ring gear. The housing assembly receives the differential assembly. The lubricant reservoir is disposed above the differential assembly and captures lubricant that is splashed by the ring gear. The lubricant distribution trough receives lubricant from the lubricant reservoir. The lubricant distribution trough includes a first trough, a second trough, and a dam. The first trough receives lubricant from the lubricant reservoir. The second trough is disposed below the first trough. The dam separates the first trough from the second trough.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
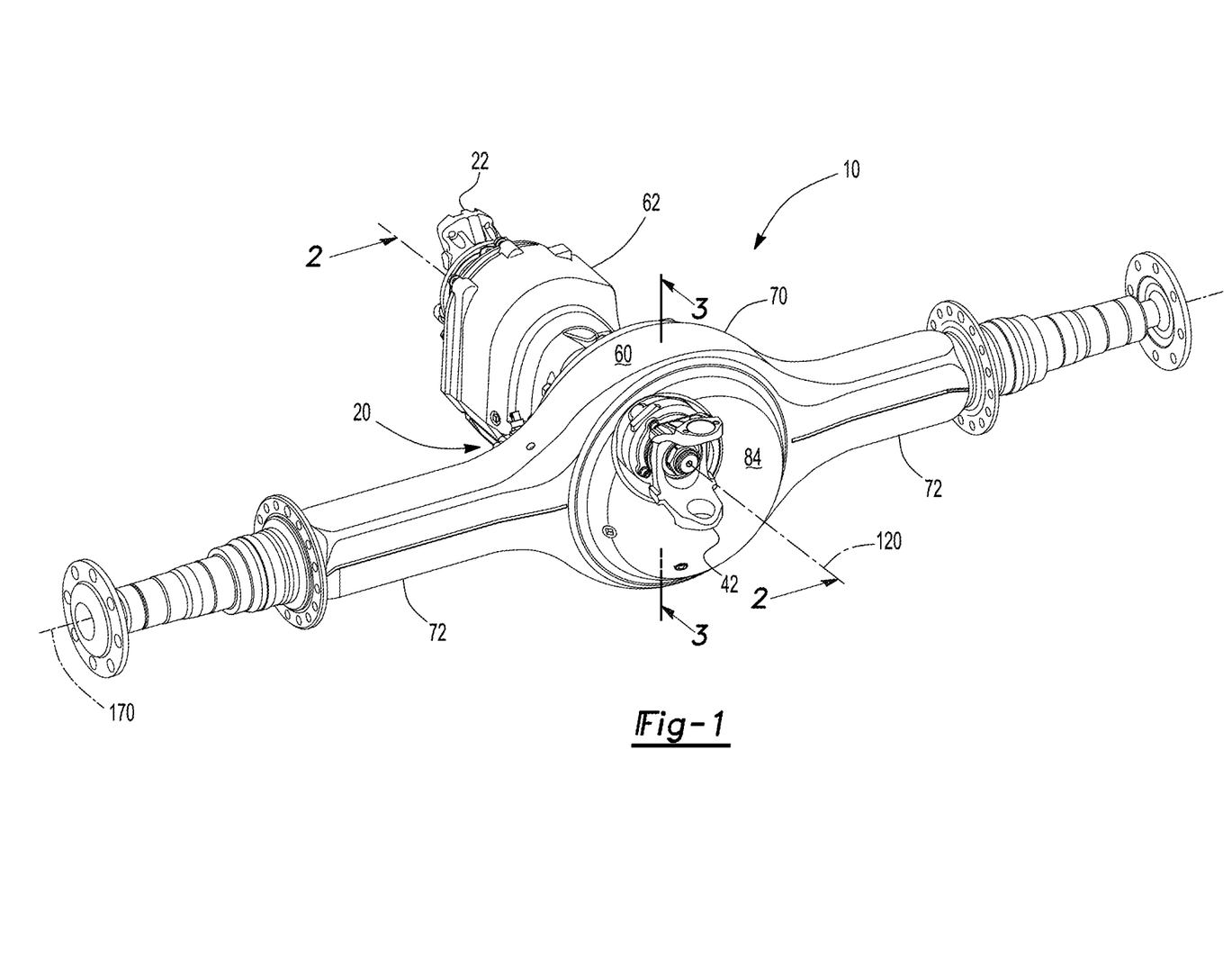
FIG. 1 is a perspective view of an example of an axle assembly.

Referring to FIG. 1, an example of an axle assembly 10 is shown. The axle assembly 10 may be provided with a vehicle of any suitable type, such as a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies connected in series. The axle assembly 10 that is operatively connected to at least one torque source, such as an electric motor or an internal combustion engine, may be referred to as a first axle assembly. The axle assembly that receives propulsion torque from the torque source by way of the first axle assembly may be referred to as a second axle assembly. In FIG. 1, the axle assembly 10 is depicted as being a first axle assembly.

The axle assembly 10 may provide torque to its associated wheel assemblies and may provide torque to the second axle assembly. In at least one embodiment and as is best shown with reference to FIGS. 1 and 2, the axle assembly 10 may include a housing assembly 20, an input yoke 22, an input shaft 24, a drop gear set 26, a clutch collar 28, a drive pinion 32, a differential assembly 34, at least one axle shaft 36, an interaxle differential unit 38, an output shaft 40, an output yoke 42, or combinations thereof. These components are shown to facilitate an abbreviated discussion of the operation of the axle assembly 10. The axle assembly 10 may also include a lubricant reservoir 50, a first conduit 52, and a second conduit 54.

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 60 and a differential carrier 62.

The axle housing 60 may receive and support the axle shafts 36. In at least one configuration, the axle housing 60 may include a center portion 70 and at least one arm portion 72.

Figure 2:
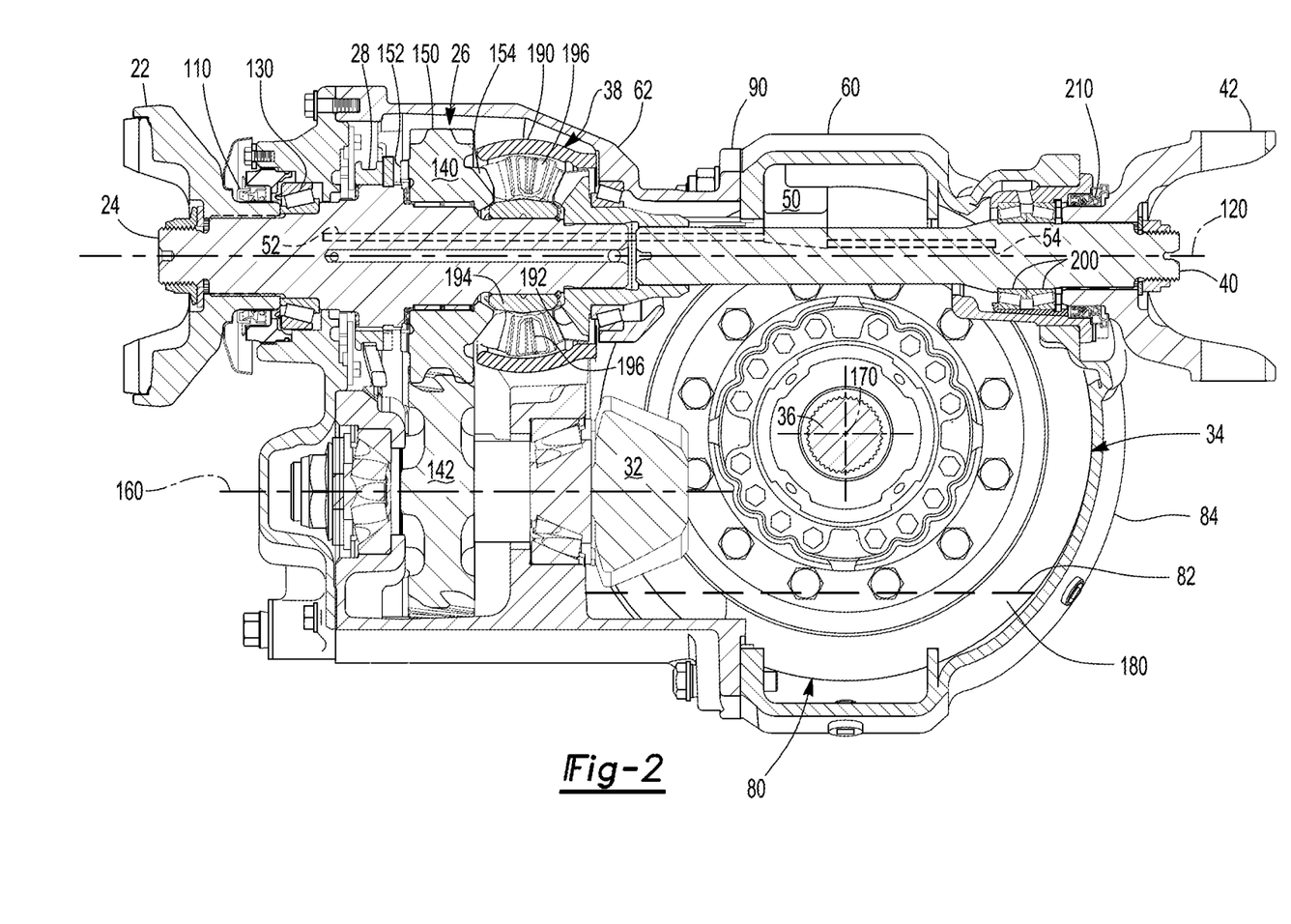
FIG. 2 is a section view of the axle assembly along section line 2-2.

The center portion 70 may be disposed proximate the center of the axle housing 60. As is best shown in FIG. 2, the center portion 70 may define an internal cavity that may at least partially receive the differential assembly 34. The internal cavity may also receive the lubricant reservoir 50. A lower region of the center portion 70 may at least partially define a sump portion 80 that may contain or collect lubricant 82. Lubricant 82 in the sump portion 80 may be splashed by the differential assembly 34 when the differential assembly 34 rotates. Some splashed lubricant 82 may be captured or collected by the lubricant reservoir 50 as will be discussed in more detail below. The center portion 70 may also include a bowl cover 84 that may be disposed opposite the differential carrier 62. In at least one configuration, the bowl cover 84 may be configured as a spherical cap or dome and may enclose a side of the center portion 70 that is disposed opposite the differential carrier 62.

The lubricant 82, which may be a liquid such as oil, may lubricate components of the axle assembly 10, such as the differential assembly 34 and various bearings. In FIG. 2, the level of the lubricant 82 in the sump portion 80 is represented by the dashed lines. The lubricant level is merely an example and may be higher or lower than what is depicted.

Referring to FIG. 1, one or more arm portions 72 may extend from the center portion 70. For example, two arm portions 72 may extend in opposite directions from the center portion 70 and away from the differential assembly 34. The arm portions 72 may have similar configurations. For example, the arm portions 72 may each have a hollow configuration or tubular configuration that may extend around a corresponding axle shaft 36 and may help separate or isolate the axle shaft 36 from the surrounding environment. An arm portion 72 or a portion thereof may be integrally formed with the center portion 70. Alternatively, an arm portion 72 may be separate from the center portion 70. In such a configuration, each arm portion 72 may be attached to the center portion 70 in any suitable manner, such as by welding or with one or more fasteners. Each arm portion 72 may define an arm cavity that may receive a corresponding axle shaft 36. The arm portion 72 and arm cavity may be disposed above the sump portion 80.

Referring primarily to FIG. 2, the differential carrier 62 may be mounted to the center portion 70 of the axle housing 60. The differential carrier 62 may support the differential assembly 34. In at least one configuration, the differential carrier 62 may include a flange portion 90. The differential carrier 62 may also include at least one differential bearing support 92 as is best shown in FIG. 3.

Referring to FIG. 2, the flange portion 90 may facilitate mounting of the differential carrier 62 to another component of the axle assembly 10, such as the axle housing 60. For example, the flange portion 90 may be disposed proximate and may engage the center portion 70 of the axle housing 60 and may have a set of holes that may receive fasteners, such as bolts, that may couple the differential carrier 62 to the axle housing 60.

Figure 3:
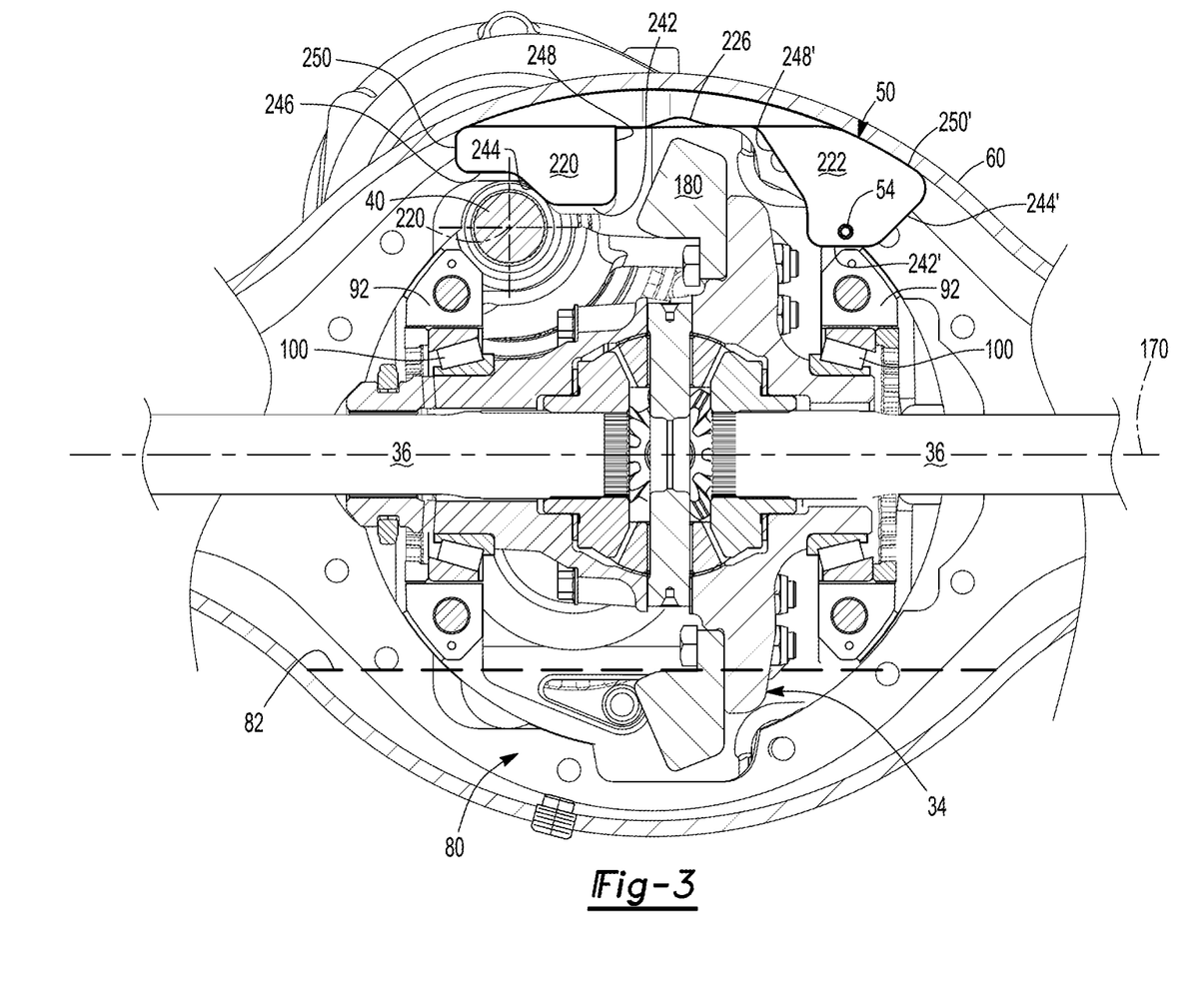
FIG. 3 is a section view of a portion of the axle assembly along section line 3-3.

Referring to FIG. 3, the differential bearing support 92 may receive a bearing 100 that may rotatably support the differential assembly 34. In FIG. 3, a bearing cap that may arch over the bearing 100 is omitted for clarity. The bearing 100 may have any suitable configuration. For instance, the bearing 100 may be a roller bearing assembly. In the configuration shown, two differential bearing supports 92 are provided with the differential carrier 62. The differential bearing supports 92 may be received inside the center portion 70 of the axle housing 60 and may be disposed proximate opposite ends of the differential assembly 34.

Referring to FIGS. 1 and 2, the input yoke 22 may facilitate coupling of the axle assembly 10 to a torque source. The input yoke 22 may be operatively connected to the input shaft 24. As is best shown in FIG. 2, an input seal 110 may be disposed adjacent to the input yoke 22. The input seal 110 may be at least partially received inside a hole in the differential carrier 62 and may encircle the input yoke 22. It is contemplated that the input yoke 22 and the input seal 110 may be omitted, such as when a torque source like an electric motor is integrated with the axle assembly 10.

Referring to FIG. 2, an example of an input shaft 24 is shown. The input shaft 24 may extend along and may be rotatable about a first axis 120. For example, the input shaft 24 may be rotatably supported by one or more bearings that may be disposed on the housing assembly 20, such as an input shaft bearing 130. The input shaft bearing 130 may be mounted to the differential carrier 62 and may encircle the input shaft 24. In addition, the input shaft bearing 130 may be disposed proximate the input seal 110. The input shaft 24 may be operatively connected to the interaxle differential unit 38.

The drop gear set 26 may be operatively connected to the input shaft 24 and to the drive pinion 32. The drop gear set 26 may include a first gear 140 and a second gear 142.

The first gear 140, which may also be referred to as a drive gear, may be rotatably disposed on the input shaft 24. In addition, the first gear 140 may be selectively coupled to the input shaft 24 with the clutch collar 28. For instance, the first gear 140 may be rotatable about the first axis 120 with the input shaft 24 when the clutch collar 28 couples the first gear 140 to the input shaft 24 and the first gear 140 may be rotatable about the first axis 120 with respect to the input shaft 24 when the clutch collar 28 does not couple the first gear 140 to the input shaft 24. In at least one configuration, the first gear 140 may have a center bore that may receive the input shaft 24 and optionally a bearing that may rotatably support the first gear 140 on the input shaft 24. In at least one configuration, the first gear 140 may include outer gear teeth 150, face gear teeth 152, and side gear teeth 154.

The outer gear teeth 150 may engage and may mesh with teeth on the second gear 142. The outer gear teeth 150 may extend away from the first axis 120 and may be arranged around an outside diameter of the first gear 140.

The face gear teeth 152 may include a set of teeth that may be arranged on a side or face of the first gear 140 that may face away from the interaxle differential unit 38 and toward the clutch collar 28. The face gear teeth 152 may selectively engage teeth on the clutch collar 28, such as when the clutch collar 28 couples the first gear 140 to the input shaft 24.

The side gear teeth 154 may be disposed on an opposite side of the first gear 140 from the face gear teeth 152. The side gear teeth 154 may be arranged around the first axis 120 and that may face toward and may mesh with one or more pinion gears 196 that may be disposed inside the interaxle differential unit 38.

The second gear 142, which may also be referred to as a driven gear, may be rotatable about a second axis 160. For example, the drive pinion 32 may be received in a center bore of the second gear 142 and the second gear 142 may be fixedly disposed on the drive pinion 32 or may be couplable to the drive pinion 32 such that the second gear 142 and the drive pinion 32 may rotate together about the second axis 160. The second gear 142 may include a plurality of teeth that may be generally arranged about an outside diameter of the second gear 142 and that may mate or mesh with the teeth of the outer gear teeth 150 of the first gear 140. The second axis 160 may be disposed substantially parallel to the first axis 120. The term "substantially parallel" as used herein means the same as or very close to parallel and includes features or axes that are within ±2° of being parallel each other.

Referring to FIG. 2, the clutch collar 28, if provided, may be moveable along the first axis 120 to engage or disengage the first gear 140. For instance, the clutch collar 28 may have a spline that may mate with a corresponding spline of the input shaft 24 such that the clutch collar 28 is rotatable about the first axis 120 with the input shaft 24 and may be movable along the first axis 120 with respect to the input shaft 24. The clutch collar 28 may have a clutch collar face gear that may be selectively engageable with the face gear teeth 152 of the first gear 140.

The drive pinion 32 may operatively connect the torque source to the differential assembly 34. The drive pinion 32 may be spaced apart from the input shaft 24 and may be configured to rotate about an axis, such as a second axis 160.

The drive pinion 32 may rotate with the second gear 142. It is also contemplated that the drive pinion 32 may rotate about the first axis 120 in other configurations, such as when the first gear 140 and the second gear 142 are omitted or when the output shaft 40 extends through the drive pinion 32. A gear portion may be disposed at an end of the drive pinion 32.

Referring to FIGS. 2 and 3, the differential assembly 34 may be received in the housing assembly 20. For instance, the differential assembly 34 may be at least partially received inside the axle housing 60. The differential assembly 34 may be rotatable about an axis, such as a differential axis 170. In at least one configuration, the differential axis 170 may be disposed substantially perpendicular to the second axis 160. The term "substantially perpendicular" is used herein to designate features or axes that are the same as or very close to perpendicular and includes features that are within ±2° of being perpendicular each other. The differential assembly 34 may transmit torque to the axle shafts 36 and wheels. For example, the differential assembly 34 may be operatively connected to the axle shafts 36 and may permit the axle shafts 36 to rotate at different rotational speeds in a manner known by those skilled in the art. The differential assembly 34 may have a ring gear 180 that may have teeth that may mate or mesh with the teeth of the gear portion of the drive pinion 32. Accordingly, the differential assembly 34 may receive torque from the drive pinion 32 via the ring gear 180 and transmit torque to the axle shafts 36. For instance, the ring gear 180 may be fixedly mounted to a case of the differential assembly 34. The case may receive gears that may be operatively connected to the axle shafts 36. The ring gear 180 may be rotatable about that differential axis 170 with the case and may splash lubricant 82 that has accumulated in the sump portion 80 as it rotates.

Referring to FIG. 1, the axle shafts 36 may transmit torque from the differential assembly 34 to corresponding wheel hubs and wheels. The axle shafts 36 may extend along and may be rotatable about an axis, which may be the differential axis 170. Each axle shaft 36 may have a first end and a second end. The first end may be operatively connected to the differential assembly 34. The second end may be disposed opposite the first end and may be operatively connected to a wheel.

Referring to FIG. 2, an example of an interaxle differential unit 38 is shown. The interaxle differential unit 38 may accommodate or compensate for rotational speed differences between different drive axle assemblies, such as speed differences between the axle assembly 10 and a second axle assembly that is connected in series with the axle assembly 10. The interaxle differential unit 38 may be provided in various locations. In FIG. 3, the interaxle differential unit 38 is disposed inside the differential carrier 62 on the input shaft 24; however, it is contemplated that the interaxle differential unit 38 may be provided in other locations, such as closer to the output yoke 42 or with the second axle assembly. It is also contemplated that interaxle differential unit 38 may be disposed on a shaft other than the input shaft 24. In at least one configuration, the interaxle differential unit 38 may include a case 190 that may receive an interaxle differential unit gear nest. The interaxle differential unit gear nest may include a plurality of gears that may operatively connect the input shaft 24 to the output shaft 40. In at least one configuration, the interaxle differential unit gear nest may include a side gear 192, the spider 194, and one or more pinion gears 196.

The side gear 192 may partially extend into the case 190. The side gear 192 may be mounted to the output shaft 40. As such, the side gear 192 may be rotatable about the first axis 120 with the output shaft 40.

The spider 194 may be fixedly disposed on the input shaft 24. For instance, the spider 194 may include a center bore that may include splines that may mate with corresponding splines on the input shaft 24 to help align and secure the spider 194 to the input shaft 24. As such, the spider 194 may rotate about the first axis 120 with the input shaft 24. The spider 194 may also include one or more pins that may extend away from the center bore of the spider 194.

One or more pinion gears 196 may be rotatable with respect to the spider 194. For instance, a pinion gear 196 may be rotatably disposed on a pin of the spider 194. The pinion gear 196 may include teeth that may mesh or mate with the side gear teeth 154 of the first gear 140 and may mesh or mate with teeth of the side gear 192.

Referring to FIG. 2, the output shaft 40 may extend along and may be configured to rotate about an axis, such as the first axis 120. For instance, the output shaft 40 may be supported by one or more bearings that may be disposed on the axle housing 60, such as an output shaft bearing 200. The output shaft bearing 200 may be mounted to the axle housing 60 and may encircle the output shaft 40. The output shaft 40 may be fixedly coupled to the side gear 192.

Referring to FIGS. 1 and 2, the output yoke 42 may facilitate coupling of the axle assembly 10 to another axle assembly. For instance, the output yoke 42 may be fixedly coupled to the output shaft 40 and may be operatively connected to a second axle assembly in any suitable manner, such as via a prop shaft. As is best shown in FIG. 2, an output seal 210 may be disposed adjacent to the output yoke 42. For instance, the output seal 210 may be at least partially received inside a hole in the axle housing 60 and may encircle the output yoke 42. It is contemplated that the output yoke 42 and the output seal 210 may be omitted in various configurations.

Referring to FIGS. 2 and 3, lubricant reservoir 50 may be disposed above the differential assembly 34. The lubricant reservoir 50 may capture lubricant 82 that is splashed by the differential assembly 34. For instance, the lubricant reservoir 50 may capture lubricant 82 that is splashed by the ring gear 180 as the ring gear 180 rotates about the differential axis 170. The lubricant reservoir 50 may be positioned above the first axis 120. In addition, the lubricant reservoir 50 may be received inside the axle housing 60 such that the lubricant reservoir 50 may be spaced apart from the bowl cover 84. The lubricant reservoir 50 may have a unitary configuration or may be configured as a one-piece component. In at least one configuration and as is best shown with reference to FIG. 4, the lubricant reservoir 50 may have a first tank 220, a second tank 222, a main panel 224, a bridge 226, and a lip 228.

Figure 4:
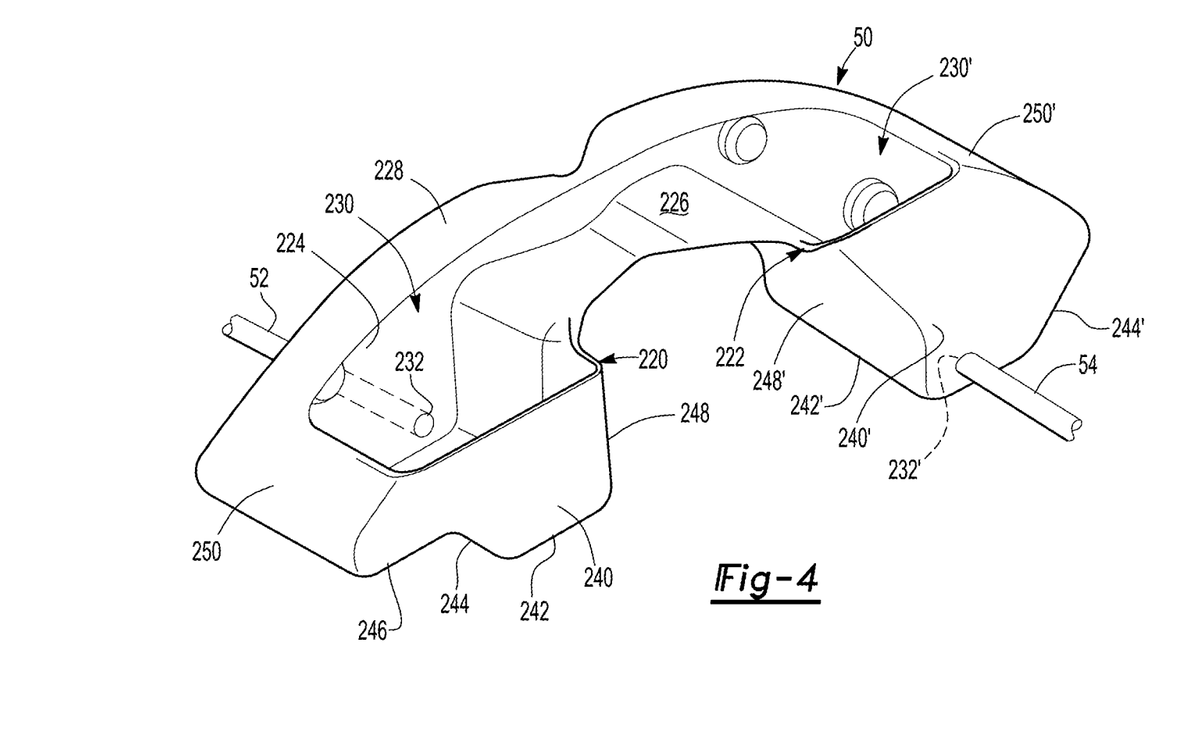
FIG. 4 is a perspective view of a lubricant reservoir.

Referring to FIG. 3, the first tank 220 may be disposed above the output shaft 40 and the first axis 120. In at least one configuration, the teeth of the ring gear 180 may face toward the first tank 220. As is best shown in FIG. 4, the first tank 220 may have an upward facing inlet 230 that may receive splashed lubricant and at least one outlet 232. The first tank 220 may be defined by a plurality of panels. For instance, the first tank 220 may be at least partially defined by the main panel 224 and may be further defined by an end panel 240, a bottom panel 242, a ramp panel 244, a ledge panel 246, an inboard panel 248, an outboard panel 250, or combinations thereof.

The end panel 240 may be disposed opposite the main panel 224 and may be spaced apart from the main panel 224. As such, the end panel 240 may face away from the axle housing 60, the differential carrier 62, or both. The end panel 240 may extend upward from the bottom panel 242. In at least one configuration, the end panel 240 may be disposed substantially parallel to the main panel 224.

The bottom panel 242 may extend between the main panel 224 and the end panel 240. For instance, the bottom panel 242 may extend from the main panel 224 to the end panel 240. The bottom panel 242 may be disposed closer to the differential axis 170 than other panels of the first tank 220. As is best shown in FIG. 5, the bottom panel 242 may slope downward from the end panel 240 to the main panel 224.

Figure 5:
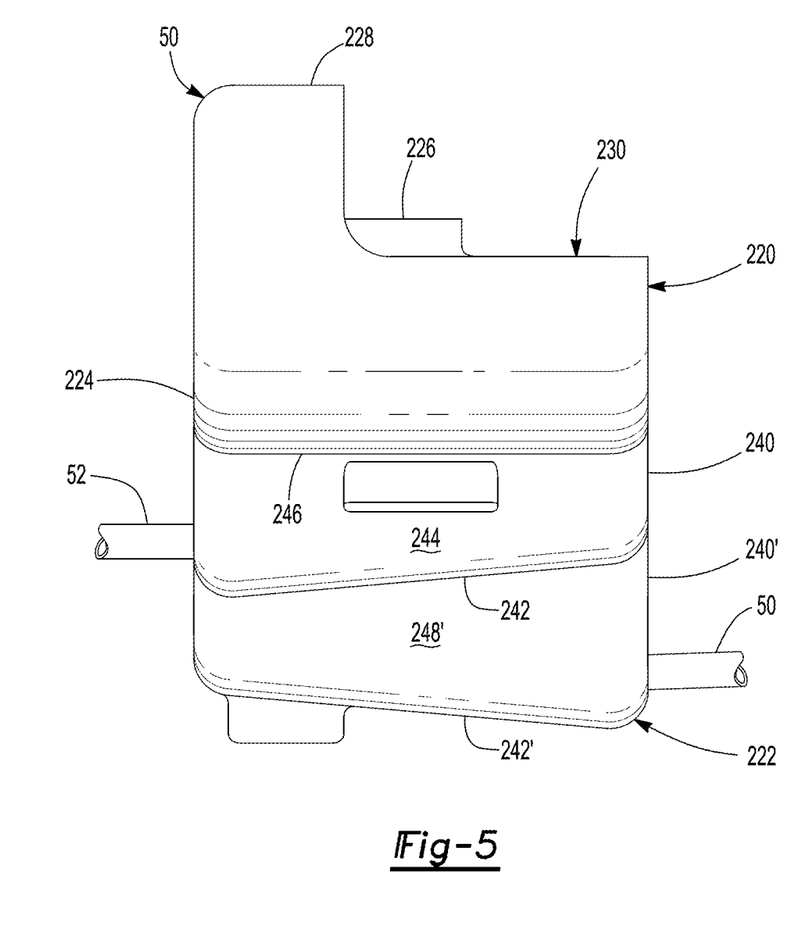
FIG. 5 is a side view of the lubricant reservoir.

Referring to FIGS. 4 and 5, the ramp panel 244 may extend between the bottom panel 242 and the ledge panel 246. In at least one configuration, the ramp panel 244 may extend at an angle such that the ramp panel 244 may extend further from the differential axis 170 or further upward as the distance from the ring gear 180 increases.

The ledge panel 246 may extend between the ramp panel 244 and the outboard panel 250. The ledge panel 246 may be positioned further above the differential axis 170 than the bottom panel 242. The ledge panel 246 may be disposed directly above the output shaft 40 and the first axis 120. In at least one configuration, the ledge panel 246 may extend substantially parallel to the first axis 120.

Referring primarily to FIGS. 3 and 4, the inboard panel 248 may extend from the main panel 224 to the end panel 240. In addition, the inboard panel 248 may extend from the bottom panel 242 to the bridge 226. The inboard panel 248 may face toward the ring gear 180.

The outboard panel 250 may be disposed opposite the inboard panel 248 and may be spaced apart from the inboard panel 248. The outboard panel 250 may extend from the main panel 224 to the end panel 240. In addition, the outboard panel 250 may extend from the ledge panel 246 to the upward facing inlet 230 and to the lip 228. The outboard panel 250 may follow the curvature of the interior side of the center portion 70 of the axle housing 60.

Referring primarily to FIGS. 3 and 4, the second tank 222 may be spaced apart from the first tank 220. The ring gear 180 may be positioned between and may extend between the first tank 220 and the second tank 222. The second tank 222 may be disposed above a differential bearing support 92. The second tank 222 may hold the same volume of lubricant 82 or a different volume of lubricant 82 as compared to the first tank 220. In the configuration shown, the second tank 222 has a greater volume than the first tank 220. The second tank 222 may have an upward facing inlet 230' that may receive splashed lubricant and at least one outlet 232'. The second tank 222 may be defined by a plurality of panels. For instance, the second tank 222 may be at least partially defined by the main panel 224 and may be further defined by an end panel 240', a bottom panel 242', a ramp panel 244', an inboard panel 248', an outboard panel 250', or combinations thereof.

The end panel 240' may be disposed opposite the main panel 224 and may be spaced apart from the main panel 224. As such, the end panel 240' may face away from the axle housing 60, the differential carrier 62, or both. The end panel 240' may extend upward from the bottom panel 242'. In at least one configuration, the end panel 240' may be disposed substantially parallel to the main panel 224 in may be coplanar with the end panel 240 of the first tank 220. In the configuration shown, the outlet 232' of the second tank 222 is provided with the end panel 240'; however, it is contemplated that the outlet 232' may be provided with other panels of the second tank 222.

The bottom panel 242' may extend between the main panel 224 and the end panel 240'. For instance, the bottom panel 242' may extend from the main panel 224 to the end panel 240'. The bottom panel 242' may be disposed closer to the differential axis 170 than other panels of the second tank 222. In at least one configuration, the bottom panel 242' may be disposed directly above a differential bearing support 92. As is best shown in FIG. 5, the bottom panel 242' may slope downward from the main panel 224 to the end panel 240'. In addition, the bottom panel 242 of the first tank 220 may be disposed further above the sump portion 80 than the bottom panel 242' of the second tank 222 is disposed from the sump portion 80. In one or more configurations, the bottom panel 242 may be disposed above the first axis 120 while the bottom panel 242' may be disposed below the first axis 120.

Referring to FIGS. 3 and 4, the ramp panel 244' may extend between the bottom panel 242' and the outboard panel 250'. In at least one configuration, the ramp panel 244' may extend at an angle such that the ramp panel 244' may extend further from the differential axis 170 or further upward as the distance from the ring gear 180 increases.

The inboard panel 248' may extend from the main panel 224 to the end panel 240'. In addition, the inboard panel 248' may extend from the bottom panel 242' to the bridge 226. The inboard panel 248' may face toward the ring gear 180. In at least one configuration and as is best shown in FIG. 3, the inboard panel 248' may have a nonplanar configuration and may be configured such that at least a portion of the inboard panel 248' extends toward the first tank 220 as the distance from the differential axis 170 increases.

The outboard panel 250' may be disposed opposite the inboard panel 248' and may be spaced apart from the inboard panel 248'. The outboard panel 250' may extend from the main panel 224 to the end panel 240'. In addition, the outboard panel 250' may extend from the ramp panel 244' to the upward facing inlet 230' and to the lip 228. The outboard panel 250' may follow the curvature of the interior side of the center portion 70 of the axle housing 60.

Referring primarily to FIGS. 3 and 4, the main panel 224 may partially define the first tank 220 and the second tank 222. The main panel 224 may face toward the differential carrier 62 and may engage the center portion 70 of the axle housing 60. In addition, the main panel 224 may extend in a vertical direction from the bridge 226 to the lip 228. In at least one configuration, the main panel 224 may be disposed substantially perpendicular to the first axis 120 and may include one or more indentations that may receive the ends of fasteners that may couple the differential carrier 62 to the axle housing 60. In the configuration shown, the outlet 232 of the first tank 220 is provided with the main panel 224; however, it is contemplated that the outlet 232 may be provided with other panels of the first tank 220.

The bridge 226 may interconnect the first tank 220 and the second tank 222. The bridge 226 may extend above and may extend over the ring gear 180. In addition, the bridge 226 may direct lubricant 82 that is splashed by the ring gear 180 and that lands on top of the bridge 226 to the first tank 220 and the second tank 222. For instance as is best shown in FIG. 3, the bridge 226 may be crowned or may protrude upward at a location that is disposed directly above the ring gear 180 and thus at least a portion of the bridge 226 may be sloped away from the protrusion and toward the first tank 220, the second tank 222, or both.

Referring primarily to FIG. 4, the lip 228 may be disposed proximate the top of the lubricant reservoir 50. The lip 228 may extend from the main panel 224 in a direction that extends over the first tank 220, second tank 222, the bridge 226, or combinations thereof. The lip 228 may engage the inner side of the center portion 70 of the axle housing 60 and may extend from the first tank 220 to the second tank 222. For instance, the lip 228 may extend from the outboard panel 250 of the first tank 220 over the bridge 226 and to the outboard panel 250' of the second tank 222.

Referring to FIGS. 2 and 4, the first conduit 52 may be fluidly connected to the outlet 232 of the first tank 220. The first conduit 52 is hidden behind the output shaft 40 from the perspective shown in FIG. 2. The first conduit 52 may have any suitable configuration. For instance the first conduit 52 may be configured as a tube, pipe, conduit, channel, hose, or the like. In at least one configuration, the first conduit 52 may route lubricant from the first tank 220 to the input seal 110, the input shaft bearing 130, or combinations thereof. For instance, the first conduit 52 may extend between the main panel 224 and the input shaft bearing 130.

The second conduit 54 may be fluidly connected to the outlet 232' of the second tank 222. The second conduit 54 is hidden behind the output shaft 40 from the perspective shown in FIG. 2. The second conduit 54 may have any suitable configuration as previously discussed with respect to the first conduit 52. In at least one configuration, the second conduit 54 may route lubricant 82 from the second tank 222 to the output shaft bearing 200, the output seal 210, or combinations thereof. For instance, the second conduit 54 may extend between the end panel 240' of the second tank 222 and the output shaft bearing 200. The first conduit 52, the second conduit 54, or both may be sloped downward away from the lubricant reservoir 50 to further facilitate the flow of lubricant 82 in one or more configurations. As such, the first tank 220 and the first conduit 52 may lubricate different components than the second tank 222 and the second conduit 54. This may be accomplished by having a single conduit may extend from each tank 220, 222.

Figure 6:
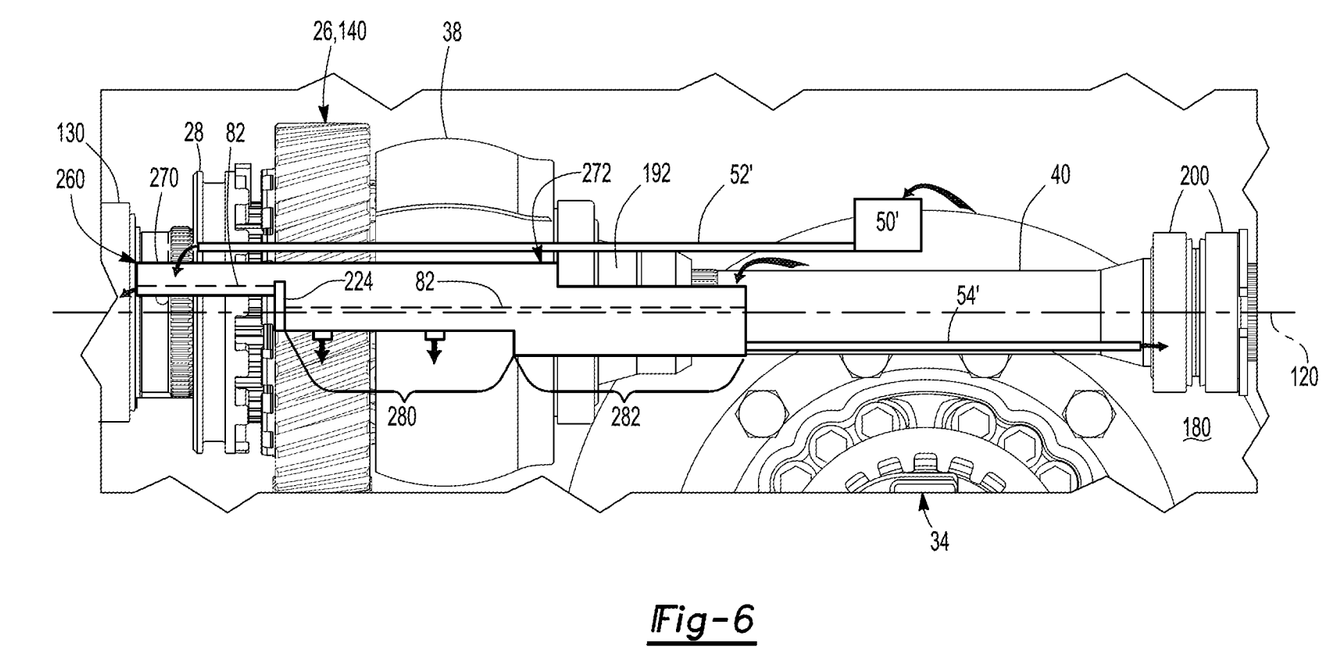
FIG. 6 is a magnified side view of a portion of the axle assembly including a lubricant reservoir and a lubricant distribution trough.

Referring to FIG. 6, another configuration for distributing lubricant in an axle assembly is shown. FIG. 6 is similar to FIG. 2 but is illustrated as a side view rather than a section view and omits the perimeter of the housing assembly 20 for clarity. This configuration may include a lubricant reservoir 50' and a lubricant distribution trough 260.

The lubricant reservoir 50' may have a similar configuration or the same configuration as the lubricant reservoir 50 previously discussed. For instance, the lubricant reservoir 50' may have one or more tanks and may receive lubricant 82 that is splashed by the differential assembly 34. At least one tank of the lubricant reservoir 50' may provide lubricant 82 to the lubricant distribution trough 260 via a conduit, such as the first conduit 52'.

The lubricant distribution trough 260 may receive lubricant 82 from the lubricant reservoir 50'. The lubricant distribution trough 260 may be positioned at a lower elevation than the lubricant reservoir 50'. In at least one configuration, the lubricant distribution trough 260 may include a first trough 270, a second trough 272, and a dam 274. The lubricant levels in the lubricant distribution trough 260 are examples and may be higher or lower than what is depicted.

The first trough 270 may receive lubricant 82 from the lubricant reservoir 50'. For instance, lubricant 82 that exits the first conduit 52' may flow into the first trough 270. The first trough 270 may have an outlet that may provide or direct lubricant 82 to the input seal 110, the input shaft bearing 130, or both. Flow of lubricant through the outlet is represented by the arrowed line extending from the left end of the first trough 270.

The second trough 272 may be disposed below the first trough 270. As such, the bottom of the second trough 272 or a portion thereof may be provided at a lower elevation than the bottom of the first trough 270. In the configuration shown, the bottom of the second trough 272 is disposed below the first axis 120 while the bottom of the first trough 270 is disposed above the first axis 120. The second trough 272 may provide lubricant 82 to components that may be located between the input shaft bearing 130 and the differential assembly 34. For instance, the second trough 272 may provide lubricant 82 to the drop gear set 26, the interaxle differential unit 38, or both. In at least one configuration, the second trough 272 may be divided into an upper portion 280 and a lower portion 282.

The upper portion 280 may extend from the dam 274 to the lower portion 282. The upper portion 280 may be elevated with respect to the lower portion 282. For instance, the upper portion 280 may be positioned at a lower elevation than the first trough 270 and at a higher elevation than the lower portion 282. In at least one configuration, the upper portion 280 may have outlets that may provide lubricant 82 to the drop gear set 26, the interaxle differential unit 38, bearings that support these components, or combinations thereof. The outlets are represented by the arrowed lines extending downward from the bottom of the upper portion 280.

The lower portion 282, if provided, may extend from the upper portion 280 toward the differential assembly 34. In at least one configuration, the lower portion 282 may receive lubricant 82 that is splashed by the differential assembly 34 as represented by the curved arrowed line near the right end of the lower portion 282.

The dam 274 may separate the first trough 270 from the second trough 272. The dam 274 may protrude upward above the bottom of the first trough 270. As such, lubricant 82 that enters the first trough 270 may be temporarily stored in the first trough 270. Lubricant 82 may exit the first trough 270 in two main ways. First, lubricant 82 may exit the first trough 270 through an outlet to lubricate the input seal 110, input shaft bearing 130, or both as previously discussed. In addition, lubricant 82 may flow over the top of the dam 274 when the level of lubricant 82 exceeds the volume of lubricant 82 that can be stored behind the dam 274. The volume of lubricant 82 that is provided to the first trough 270 when the differential assembly 34 is rotating at moderate to high speeds may exceed the storage capacity of the first trough 270, resulting in lubricant 82 overflowing the top of the dam 274 and spilling into the second trough 272. Excess lubricant 82 may exit the second trough 272 and spill into the sump portion 80. The lubricant reservoir 50' may empty when the differential assembly 34 is stationary and lubricant 82 is not being splashed into the lubricant reservoir 50'. As a result, the flow of lubricant 82 from the lubricant reservoir 50' to the first trough 270 may decrease at lower rotational speeds and may stop once the lubricant reservoir 50' is empty. Lubricant 82 that is captured behind the dam 274 may not overtop the dam 274 but instead may exit through the outlet to lubricate components such as the input shaft bearing 130 even though splashed lubrication is not being provided to the first trough 270. In addition or alternatively, lubricant 82 provided to the lubricant distribution trough 260 may be routed to lubricate various components for a limited period of time such as during low-speed operating conditions during which little splash lubrication is available The flow rate through any of the outlets of the lubricant distribution trough 260 may be actively or passively controlled to help provide lubricant 82 to various components over an extended period of time.

Optionally, the lubricant reservoir 50', the second trough 272, or both, may have a second conduit 54' that may provide lubricant to the output shaft bearing 200, output seal 210, or both. It is also contemplated that the second conduit 54' may be omitted and the second trough 272 may be open-ended. It is also contemplated, that the second conduit may be configured as in FIG. 2 and may receive lubricant from the lubricant reservoir 50' rather than the lubricant distribution trough 260.

An axle assembly as described above may allow a lubricant reservoir to be provided at an elevated location where splashed lubricant may be captured. Capturing lubricant in a lubricant reservoir disposed outside of the sump portion may help reduce drag and churning losses on the differential assembly, which may help improve the operating efficiency of the axle assembly. Captured lubricant may be distributed to components that are remotely located from the differential assembly and that may be positioned in locations where splashed lubricant may not reach in sufficient quantities. Moreover, an axle assembly as described above may store lubricant and help lubricate components when the differential assembly is not rotating. For instance, if torque is not provided to the differential assembly such as by disengaging torque transmission through the drop gear set and by disconnecting the differential assembly from its associated wheels, then the differential assembly may not rotate and splash lubricant. However, components such as the input shaft, output shaft, interaxle differential unit, and associated bearings may still rotate as torque is transmitted from one axle assembly to another. The present invention may store and distribute lubricant to these components and bearings associated with these components to help reduce friction, reduce wear, and reduce operating temperatures, which may help increase component life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a differential assembly that is rotatable about an axis and that has a ring gear;
   a housing assembly that has an axle housing and a differential carrier that supports the differential assembly, wherein the differential carrier is mounted to the axle housing and the axle housing receives the differential assembly;
   a lubricant reservoir that is disposed inside the axle housing above the differential assembly and that captures lubricant that is splashed by the ring gear, the lubricant reservoir having a first tank and a second tank that is spaced apart from the first tank;
   a first conduit that routes lubricant from the first tank to an input shaft bearing; and
   a second conduit that routes lubricant from the second tank to an output shaft bearing.

2. The axle assembly of claim 1 wherein the ring gear extends between the first tank and the second tank.

3. The axle assembly of claim 1 wherein the first tank is disposed above the output shaft.

4. The axle assembly of claim 1 wherein the second tank is disposed above a differential bearing support that receives a bearing that rotatably supports the differential assembly.

5. The axle assembly of claim 1 wherein the lubricant reservoir includes a bridge that extends above the ring gear and that interconnects the first tank and the second tank.

6. The axle assembly of claim 5 wherein the bridge directs lubricant that is splashed by the ring gear to the first tank and the second tank.

7. The axle assembly of claim 5 wherein the lubricant reservoir has a lip that engages the axle housing and that extends over the bridge, wherein the lip extends from the first tank to the second tank.

8. The axle assembly of claim 7 wherein the lubricant reservoir has a main panel that extends from the bridge to the lip and that partially defines the first tank and the second tank.

9. The axle assembly of claim 7 wherein the lubricant reservoir has a main panel that partially defines the first tank and the second tank and that faces toward the differential carrier.

10. The axle assembly of claim 9 wherein the first tank has an end panel that is disposed opposite the main panel and a bottom panel that slopes downward from the end panel to the main panel.

11. The axle assembly of claim 10 wherein the first conduit extends from the main panel.

12. The axle assembly of claim 10 wherein the second tank has an end panel that is disposed opposite the main panel and a bottom panel that slopes downward from the main panel to the end panel.

13. The axle assembly of claim 12 wherein the second conduit extends from the end panel.

14. The axle assembly of claim 12 wherein the bottom panel of the first tank is disposed further from a sump portion of the axle housing than the bottom panel of the second tank is disposed from the sump portion.

15. An axle assembly comprising:
   a differential assembly that is rotatable about an axis and that has a ring gear;
   a housing assembly that receives the differential assembly;
   a lubricant reservoir that is disposed above the differential assembly and that captures lubricant that is splashed by the ring gear; and
   a lubricant distribution trough that receives lubricant from the lubricant reservoir, the lubricant distribution trough including:
      a first trough that receives lubricant from the lubricant reservoir;
      a second trough that is disposed below the first trough; and
      a dam that separates the first trough from the second trough.

16. The axle assembly of claim 15 wherein the first trough provides lubricant to an input shaft bearing that rotatably supports an input shaft.

17. The axle assembly of claim 16 wherein the second trough provides lubricant to an interaxle differential unit and a drop gear set that is operatively connected to the input shaft and to a drive pinion that meshes with the ring gear of the differential assembly.

18. The axle assembly of claim 15 wherein the second trough receives lubricant that is splashed by the differential assembly.

19. The axle assembly of claim 15 wherein the second trough is divided into an upper portion and a lower portion, wherein the upper portion extends from the dam to the lower portion and is elevated with respect to the lower portion.

20. The axle assembly of claim 19 wherein the upper portion provides lubricant to an interaxle differential unit and a drop gear set and the lower portion receives lubricant that is splashed by the differential assembly.

* * * * *